(12) United States Patent
Billod-Laillet et al.

(10) Patent No.: US 11,829,110 B2
(45) Date of Patent: Nov. 28, 2023

(54) ESCAPEMENT WHEEL, TOOL FOR MANUFACTURING AN ESCAPEMENT WHEEL AND METHOD FOR MANUFACTURING AN ESCAPEMENT WHEEL

(71) Applicant: Nivarox-FAR S.A., Le Locle (CH)

(72) Inventors: Antoine Billod-Laillet, Les Fins (FR); Frédéric Haefeli, Tramelan (CH); Marco Verardo, Les Bois (CH)

(73) Assignee: Nivarox-FAR S.A., Le Locle (CH)

( * ) Notice: Subject to any disclaimer, the term of this patent is extended or adjusted under 35 U.S.C. 154(b) by 0 days.

(21) Appl. No.: 17/682,583

(22) Filed: Feb. 28, 2022

(65) Prior Publication Data

US 2023/0004123 A1 Jan. 5, 2023

(30) Foreign Application Priority Data

Jul. 2, 2021 (EP) .................... 21183466

(51) Int. Cl.
*G04D 3/00* (2006.01)
*B23F 21/12* (2006.01)
*G04B 15/14* (2006.01)

(52) U.S. Cl.
CPC ........... *G04D 3/0033* (2013.01); *B23F 21/12* (2013.01); *G04B 15/14* (2013.01)

(58) Field of Classification Search
CPC ...... B23F 21/12; B23F 21/223; B23F 21/226; B23F 21/236; G04B 15/14; G04B 13/026; G04B 13/027; B23C 5/006; B23C 5/06; B23C 5/22; B23C 5/1081; B23C 5/109; B23C 2200/08; B23C 2200/20; B23C 2200/28; B23C 2210/00; Y10T 407/1705; Y10T 74/1502
See application file for complete search history.

(56) References Cited

U.S. PATENT DOCUMENTS

| 4,936,718 A * | 6/1990 | Proffitt | B23C 5/22 |
| | | | 407/58 |
| 2008/0075552 A1* | 3/2008 | Legge | B23B 5/167 |
| | | | 409/144 |
| 2022/0388072 A1* | 12/2022 | Hecht | B23B 27/164 |

FOREIGN PATENT DOCUMENTS

| CH | 334 710 A | 12/1958 | |
| CH | 704053 A2 | 5/2012 | |
| EP | 1 517 198 A1 | 3/2005 | |
| EP | 1 596 260 A1 | 11/2005 | |
| EP | 1596260 A1 * | 11/2005 | .......... G04B 13/026 |
| EP | 3 547 040 A1 | 10/2019 | |

OTHER PUBLICATIONS

Besse; EP-1596260-A1 Machine Translation (Year: 2005).*

(Continued)

*Primary Examiner* — Lee A Holly
(74) *Attorney, Agent, or Firm* — Sughrue Mion, PLLC

(57) ABSTRACT

A method for manufacturing an escapement wheel (10) including steps of creating an escapement wheel ébauche having a hub (11) connected to a felloe (12) by radial arms (13), and teeth (14) regularly distributed around the periphery of the felloe (12), and simultaneously machining a reduction of cross-section of the free end of each tooth (14), by a cutting tool (20) aligned coaxially with the escapement wheel ébauche.

7 Claims, 2 Drawing Sheets

(56) References Cited

OTHER PUBLICATIONS

Besse L; EP-1596260-A1 Machine Translation (Year: 2005).*
European Search Report for EP 21 18 3466 dated Dec. 6, 2021.
Office Action dated Nov. 15, 2022 in Russian Application No. 2022113208/28(027516).
S.V. Tarasov, "Technology of Watch Production", Mashgiz, 1963, pp. 285-296 (14 pages total).

* cited by examiner

ESCAPEMENT WHEEL, TOOL FOR MANUFACTURING AN ESCAPEMENT WHEEL AND METHOD FOR MANUFACTURING AN ESCAPEMENT WHEEL

CROSS REFERENCE TO RELATED APPLICATIONS

This application is an Utility Application, claiming priority based on European Patent Application No. 21183466.8 filed Jul. 2, 2021.

TECHNICAL FIELD OF THE INVENTION

The invention lies in the field of horology, and in particular of mechanical horological movements.

More particularly, the invention relates to an escapement wheel, a tool for manufacturing an escapement wheel and a method for manufacturing an escapement wheel.

Technological Background

An escapement wheel is well known in the field of horology and is intended to be connected to a mainspring that supplies it with energy in order to maintain the oscillation of a balance via pallets.

More particularly, the escapement wheel includes teeth distributed around the periphery of a felloe connected to a hub by radial branches. The pallets include pallet-stones intended to cooperate with the teeth of the escapement wheel.

This cooperation generates friction, the intensity of which it has been sought to minimise for many years in order to increase the service life of the escapement wheel and the precision of the measurement of time.

The most routine solutions are the generation of a bevel at the end of each tooth of the escapement wheel in order to reduce the contact surface between said teeth and the gathering-pallets. This arrangement is coupled with the lubrication of the end of said teeth.

Although these solutions are satisfactory, the manufacturing of the escapement poses some difficulties. In particular, the bevel of each tooth is made individually, by specific machining.

In addition to being relatively slow, this manufacturing method engenders problems of guaranteeing the tight tolerances required by the horological use.

SUMMARY OF THE INVENTION

The invention solves the aforementioned disadvantages by proposing a solution allowing to easily and quickly obtain an escapement wheel, the respect of the dimensional requirements of which is guaranteed.

For this purpose, the present invention relates to a method for manufacturing an escapement wheel comprising steps of:
  making an escapement wheel ébauche intended to be driven in rotation about an axis of rotation, and comprising a hub connected to a felloe by radial arms, and teeth regularly distributed around the periphery of the felloe,
  simultaneous machining of a reduction of cross-section of the free end of each tooth, by a cutting tool aligned coaxially with the escapement wheel ébauche.

The terms "coaxial" means that the axis of rotation of the cutting tool is the same as the axis of rotation of the ébauche of the escapement wheel.

Via this feature, the removal of material at the free end of the teeth is carried out in a single cutting operation, which allows to ensure the respect of the dimensional requirements of the escapement wheel while reducing the complexity and the manufacturing time of said escapement wheel.

In specific embodiments, the invention can further include one or more of the following features, taken alone or according to all the technically possible combinations.

In specific embodiments, the reduction of cross-section is formed by a reduced end portion including a bevel.

In specific embodiments, the reduction of cross-section machined includes a reduced end portion having the shape of a surface of revolution orthogonal to a plane in which the escapement wheel ébauche is inscribed.

In specific embodiments, the reduction of cross-section is formed by a reduced end portion including a flat surface substantially parallel to a plane in which the escapement wheel ébauche is inscribed.

In specific embodiments, the step of creating the escapement wheel ébauche is carried out by a LIGA method.

In specific embodiments, the machining step is carried out by milling.

In specific embodiments, the machining step includes the successive operations of:
  positioning the cutting tool so that its axis of rotation is the same as the axis of rotation of the escapement wheel ébauche;
  guiding the cutting tool in translation towards the escapement wheel ébauche according to a direction coaxial to the axis of rotation of the escapement wheel ébauche, and blanking a part of the end of each tooth of the escapement wheel ébauche so as to generate a reduced end portion, in a single cutting operation;
  removing the tool.

According to another aspect, the present invention also relates to a cutting tool, for example for the implementation of a method for manufacturing an escapement wheel as described above, including a substantially cylindrical body intended to be driven in rotation about an axis of rotation and comprising at one of its ends at least one cutting tooth having a cutting edge extending in a diametral plane of the body, said cutting edge having a portion adapted to generate, on a part to be machined, at least one surface of revolution, the axis of revolution of which is coaxial to the axis of rotation of the tool.

More precisely, the cutting edge is adapted to blank a part of a free end of each tooth of an escapement wheel ébauche, so as to generate a reduced end portion.

In specific embodiments, the invention can further include one or more of the following features, taken alone or according to all the technically possible combinations.

In specific embodiments, the cutting edge comprises a portion called "inclined portion" forming an obtuse or acute angle with the axis of rotation of the tool.

In specific embodiments, the cutting edge comprises a portion called "rectilinear portion" parallel to the axis of rotation of the tool.

In specific embodiments, the cutting edge comprises a portion called "right portion" forming a right angle with said axis.

In specific embodiments, the cutting edge has a profile adapted to generate a functional or decorative structuring of the machined surface.

According to yet another aspect, the present invention can relate to an escapement wheel, for example obtained by the implementation of the method for manufacturing an escapement wheel as described above, including a hub connected to a felloe by radial arms and teeth regularly distributed on the periphery of the felloe, each of the teeth including a reduced end portion connected to the felloe by an intermediate portion. The reduced end portion of each of the teeth includes a reduced thickness with respect to the thickness of the intermediate portion and includes a surface of revolution, the surfaces of revolution of each of the teeth sharing the same axis of revolution.

Advantageously, the axis of revolution is the same as the axis of rotation of the escapement wheel.

In specific embodiments, the invention can further include one or more of the following features, taken alone or according to all the technically possible combinations.

In specific embodiments, the reduced end portion of each tooth includes a bevel, the bevels being arranged in such a way that they have inclined curvilinear surfaces respectively forming portions of the same frustum.

In specific embodiments, the reduced end portion of each tooth includes an end surface defining an impulse plane of the tooth, said end surface having the shape of a rectangular trapezoid.

In specific embodiments, the reduced end portion of each tooth includes a flat surface substantially parallel to a plane in which the escapement wheel is inscribed, said flat surface being connected to the bevel.

In specific embodiments, the reduced end portion of each tooth includes a surface of revolution and a flat surface substantially parallel to a plane in which the escapement wheel is inscribed, the surfaces of revolution being arranged in such a way that they respectively form portions of the same cylinder of revolution.

In specific embodiments, the surfaces of revolution and/or the flat surfaces of the teeth can have a surface state producing a lipophobic or lipophilic effect.

BRIEF DESCRIPTION OF THE DRAWINGS

Other features and advantages of the invention will appear upon reading the following detailed description given as an example that is in no way limiting, in reference to the appended drawings in which.

DETAILED DESCRIPTION OF THE INVENTION

Figure 1:
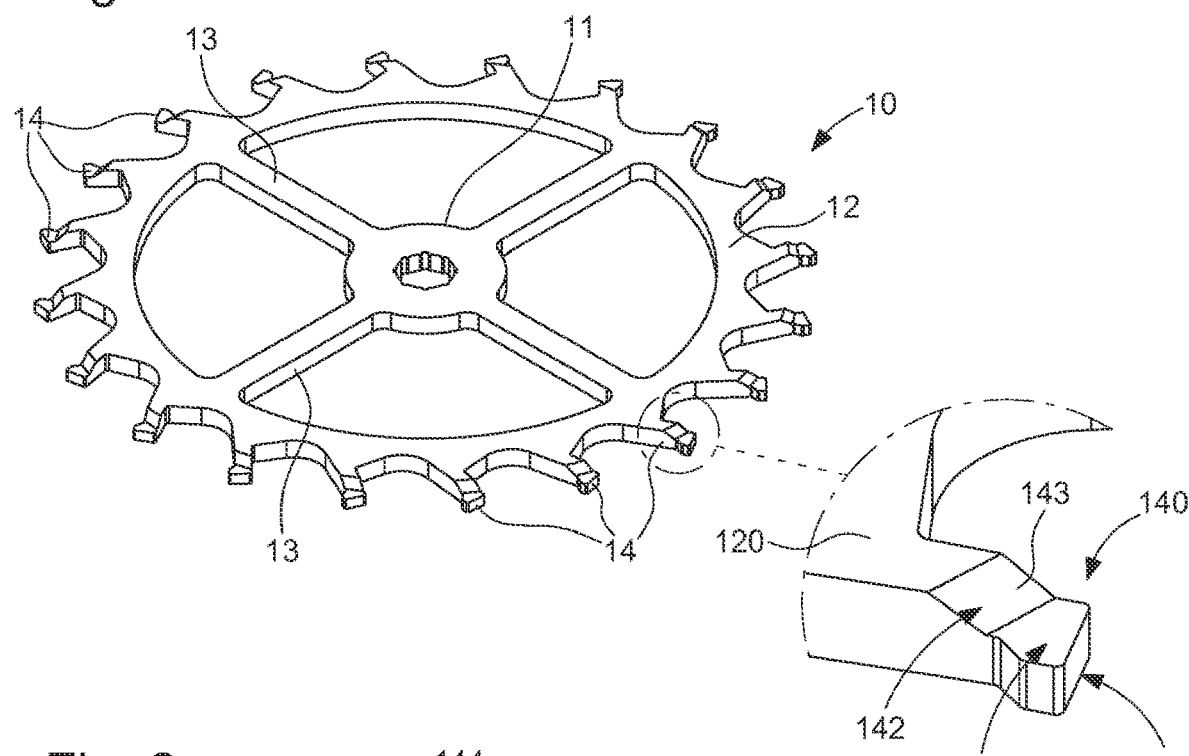
FIG. 1 shows a perspective view of an escapement wheel according to an exemplary embodiment of the invention and a detailed view of a tooth of this escapement wheel.

FIG. 1 shows an escapement wheel 10 according to the present invention, conventionally comprising a hub 11 connected to a felloe 12 by radial arms 13, and teeth 14 regularly distributed around the periphery of the felloe 12 and extending according to directions orthoradial with respect to an axis of rotation of the escapement wheel 10.

In the present text, a plane P (not shown in the drawings) in which the escapement wheel 10 is inscribed is defined, the plane P being perpendicular to the axis of rotation of said escapement wheel 10. Moreover, the term "thickness" used in the rest of the text refers to a dimension considered according to a direction parallel to the axis of rotation of the escapement wheel 10.

As shown in the detailed view of FIG. 1, each of the teeth 14 includes a reduced end portion 140 connected to the felloe 12 by an intermediate portion 120. Advantageously, the reduced end portion 140 of each of the teeth 14 includes a reduced thickness with respect to the thickness of the intermediate portion 120.

Each tooth 14 comprises an end surface 141 at the free end of the reduced end portion 140, said end surface 141 defining an impulse plane of the tooth 14. The notion of "impulse plane" is known to a person skilled in the art for defining a surface intended to come in contact with a pallet-stone of pallets in order to transmit stresses to it.

Moreover, the reduced end portion 140 of each of the teeth 14 includes a surface of revolution 142 arranged so that all of the surfaces of revolution 142 of each of the teeth 14 share the same axis of revolution. The axis of revolution is advantageously the same as the axis of rotation of the escapement wheel 10, as illustrated by FIG. 2.

Figure 2:
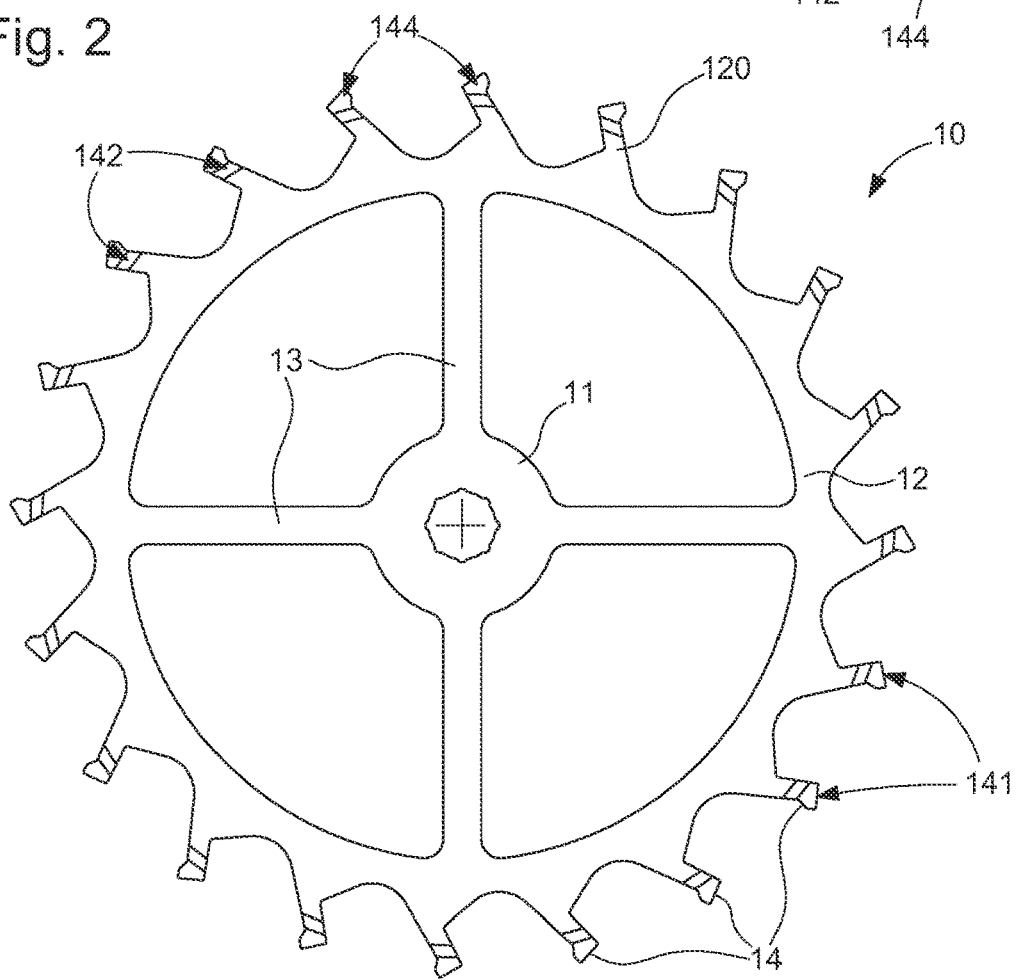
FIG. 2 shows a detailed view of the escapement wheel of FIG. 1.

In particular, in the exemplary embodiment shown in FIGS. 1 and 2, the surface of revolution 142 of each tooth 14 forms a bevel 143, the bevels 143 being arranged in such a way that they have inclined curvilinear surfaces respectively forming portions of the same frustum, the axis of revolution of which is the same as the axis of rotation of the wheel. It is obvious that the mention of a frustum refers here to a virtual geometric figure in which the inclined curvilinear surfaces are inscribed, which only has the goal of specifying the arrangement of the bevels 143.

As precisely shown by the detailed view of FIG. 1, the reduced end portion 140 of each tooth 14 can include, in addition to the surface of revolution 142, a flat surface 144 substantially parallel to the plane P. More precisely, the flat surface 144 is connected on the one hand to the surface of revolution 142 by a curvilinear edge forming an arc of a circle, the centre of which coincides with the axis of rotation of the escapement wheel 10, and on the other hand to the end surface 141, by an edge perpendicular to the orthoradial direction of the tooth 14, opposite to the curvilinear edge.

Figure 3:
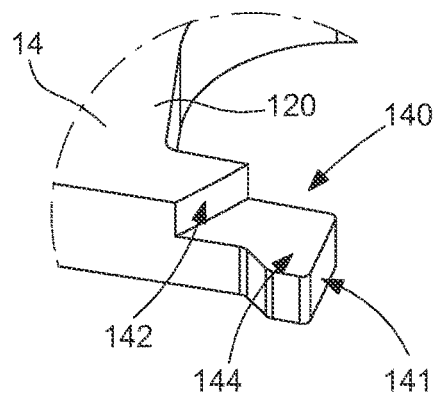
FIG. 3 shows a detailed view of a tooth of an escapement wheel according to another exemplary embodiment.

Alternatively to the bevels 143, in an exemplary embodiment shown in the detailed view of FIG. 3, the surfaces of revolution 142 can be arranged in such a way that they respectively form portions of the same cylinder of revolution, the axis of revolution of which is the same as the axis of rotation of the escapement wheel 10.

In other words, the surface of revolution 142 is orthogonal to the plane P and not inclined, contrary to the exemplary embodiment shown in FIGS. 1 and 2.

Figure 4:
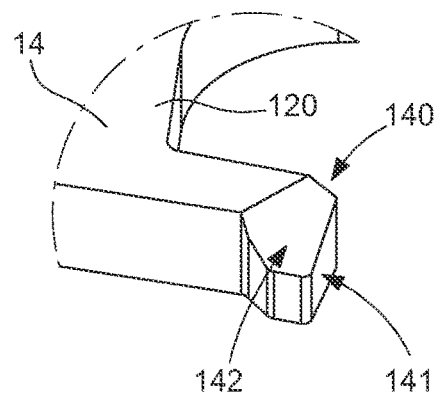
FIG. 4 shows a detailed view of a tooth of an escapement wheel according to yet another exemplary embodiment.

In yet another exemplary embodiment of the invention shown in FIG. 4, each reduced end portion 140 only includes one surface of revolution 142 formed by a bevel 143. Said reduced end portions 140 thus no longer include a flat surface 144 substantially parallel to the plane P.

The bevels 143 of all of the teeth 14 have inclined curvilinear surfaces respectively forming portions of the same frustum, the axis of revolution of which is the same as the axis of rotation of the wheel.

The inclined curvilinear surface of each bevel 143 is secant to the end surface 141, so that the latter has the shape of a rectangular trapezoid. It is therefore understood here that the thickness of the free end of each tooth 14 is thus variable.

Advantageously, the surfaces of revolution 142 and/or the flat surfaces 144 of the teeth 14 can have a surface state producing a lipophobic or lipophilic effect.

According to another aspect, the present invention relates to a cutting tool 20 for the machining of an escapement wheel ébauche to obtain an escapement wheel 10 as described above.

Figure 5:
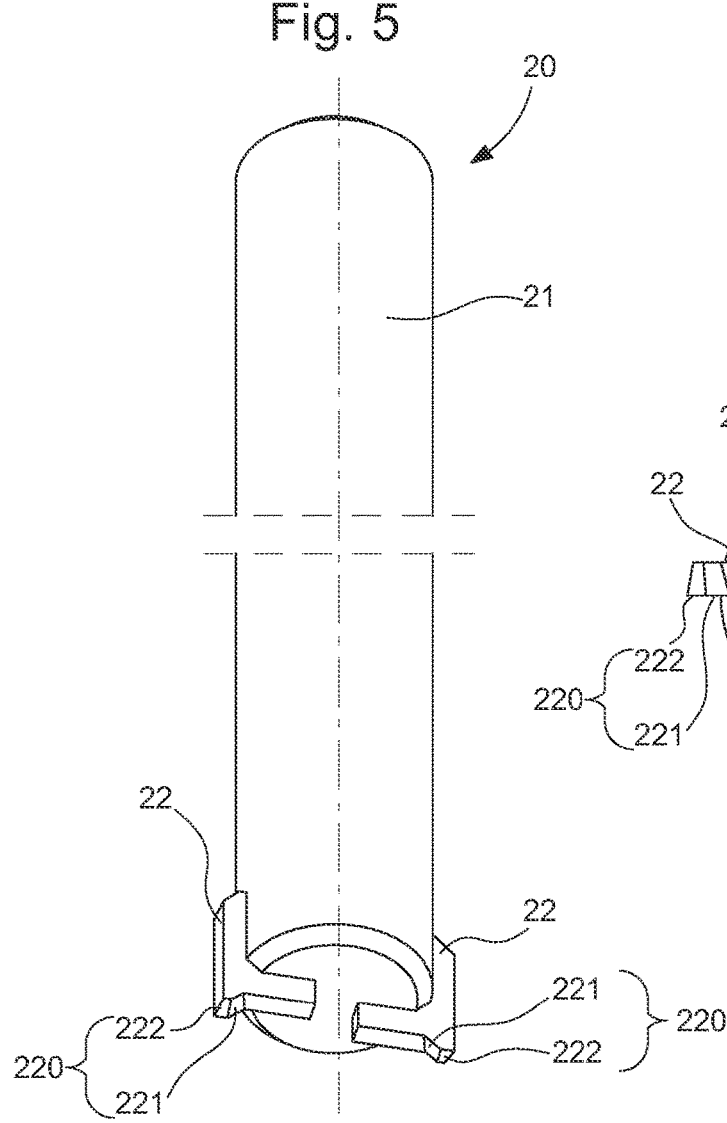
FIG. 5 shows a perspective view of a cutting tool intended for creating an escapement wheel according to the present invention.

The cutting tool 20 is in the form of a milling-cutter intended to be driven in rotation. As shown by FIG. 5 in an exemplary embodiment of the invention, the cutting tool 20 includes a substantially cylindrical body 21 comprising a first end by which it is intended to be fastened to a tool carrier, and a second end opposite to the first end. The body 21 of the cutting tool 20 extends according to a longitudinal axis that is the same as its axis of rotation.

The body 21 of the cutting tool 20 carries at its second end at least one cutting tooth 22, the latter extending beyond said second end.

Figure 6:
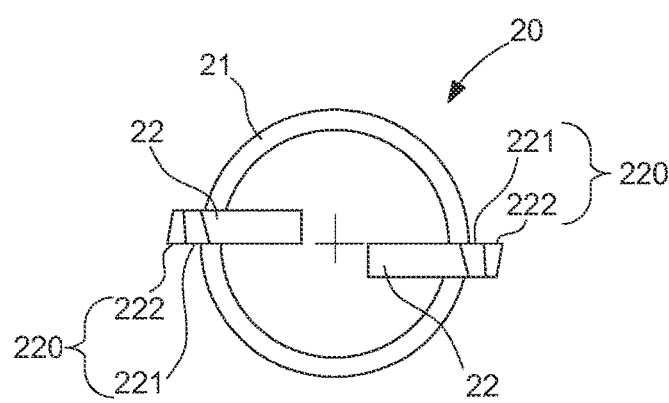
FIG. 6 shows a bottom view of the tool of FIG. 5.

In the exemplary embodiment shown in FIGS. 5 and 6, the tool includes two cutting teeth 22, each of which has a cutting edge 220 extending in a diametral plane of the body 21 of the cutting tool 20.

Precisely, as illustrated in particular in FIG. 6, the two cutting teeth 22 are diametrically opposite and are one and the other arranged respectively on either side of a diametral plane of the body 21 of the cutting tool 20. In other words, the two cutting teeth 22 are identical and are arranged with respect to one another according to a central symmetry, the axis of which is the same as the axis of rotation of the cutting tool 20.

The cutting edge 220 of each cutting tooth 22 has a portion capable of generating, on a part to be machined, a surface of revolution, the axis of revolution of which is coaxial to the axis of rotation of the tool.

More precisely, said portion is called "inclined portion" 221 and forms an obtuse or acute angle with the axis of rotation of the tool.

FIG. 5 in particular illustrates cutting edges 220, the inclined portion 221 of which is inclined towards the body 21 of the cutting tool 20. In other words, the distance separating the inclined portions 221 of the two cutting edges 220 from one another increases as the edges move away from the second end of the body 21 of the cutting tool 20.

This feature allows to be able to carry out, during a machining, a removal of material on the teeth 14 of an escapement wheel 10 ébauche in order to generate a surface of revolution 142 having the shape of a bevel 143 as described above and as illustrated in the detailed views of FIG. 1 and of FIG. 4. During this removal of material, the body 21 of the cutting tool 20 is arranged in a manner coaxial to the escapement wheel ébauche as described in more detail below.

Alternatively, the cutting edge 220 can comprise a portion called "rectilinear portion" parallel to the axis of rotation of the tool, not shown in the drawings. The rectilinear portion is advantageously adapted to generate on each of the teeth 14 of the escapement wheel, during the machining, by the rotation of the cutting tool 20 about its axis of rotation, a surface of revolution 142, all of the surfaces of revolution 142 being representative of a portion of the same cylinder.

The cutting edge 220 can comprise, in addition to the inclined portion 221 or the rectilinear portion, a portion called "right portion" 222 forming a right angle with the axis of rotation of the cutting tool 20. The right portion 222 is advantageously arranged at the end of each cutting tooth 22, and is farther away from the axis of rotation of the tool than the inclined portion 221 or the right portion 222.

Advantageously, the right portion 222 allows the creation of the flat surface 144 of the reduced end portion 140 described above.

Moreover, the inclined portion 221 or the rectilinear portion, and/or the right portion 222, can have a profile adapted to generate a functional or decorative structuring of the surfaces of revolution 142 and/or on the flat surfaces 144 of the teeth 14 of the escapement wheel 10.

The profile can in particular include a succession of crests and troughs.

The terms "functional structuring" refer here to a surface state allowing the machined surfaces to have a lipophobic or lipophilic effect.

In a manner known per se to a person skilled in the art, the cutting teeth 22 can include relief angles and are made from any suitable material, such as polycrystalline cubic boron nitride, monocrystalline or polycrystalline diamond, or a hard metal, or a composite having a metallic matrix for example made from tungsten-cobalt carbide or from tungsten-nickel carbide, on which a suitable coating, such as a coating made of polycrystalline diamond, made of "DLC" (for Diamond-like carbon), made of titanium nitride, made of titanium carbide, etc., is for example deposited.

The present invention also relates, according to another aspect, to a method for manufacturing an escapement wheel as described above.

This manufacturing method includes a preliminary step of creating an escapement wheel ébauche comprising a felloe 12, a hub 11 connected to the felloe 12 by radial arms 13 and teeth 14 regularly distributed on the periphery of the felloe 12.

After this step, the escapement wheel ébauche is consistent with a conventional escapement wheel, that is to say an escapement wheel of the prior art. Moreover, during this preliminary step, it is possible to obtain an escapement wheel ébauche by any method known to a person skilled in the art, for example by blanking and sawing.

However, it is advantageous to obtain an escapement wheel ébauche by a LIGA method for reasons discussed in detail below.

The following step consists of a step of machining, simultaneously, a reduction of cross-section of the free end of each tooth 14, by a cutting tool 20 as described above and aligned coaxially to the escapement wheel ébauche, so as to obtain for each of the teeth 14 a reduced end portion 140. Thus, after the implementation of the method, an escapement wheel 10 as described above is obtained.

Here, the terms "aligned coaxially" mean that the axis of rotation of the tool and the axis of rotation of the escapement wheel ébauche are the same. Thus, the reduction of cross-section corresponds to a reduction of the thickness of the teeth 14 of the escapement wheel ébauche.

The machining step can be carried out in such a way that the reduction of cross-section machined includes a reduced end portion 140 having the shape of a surface of revolution 142 forming a bevel 143.

Alternatively, the machining step can be carried out in such a way that the reduction of cross-section machined includes a reduced end portion 140 having the shape of a surface of revolution 142 orthogonal to the plane P.

In addition, the machining step can be carried out in such a way that the reduction of cross-section machined includes a reduced end portion 140 formed by a flat surface 144 substantially parallel to the plane P in which the escapement wheel is inscribed.

In another exemplary embodiment of the method, the machining step can be carried out in such a way that the reduction of cross-section machined includes a reduced end portion 140 formed only by a bevel 143.

The machining step is advantageously carried out by milling, and it includes the successive operations of:
- positioning the cutting tool 20 so that its axis of rotation is the same as the axis of rotation of the escapement wheel ébauche;
- guiding the cutting tool 20 in translation towards the escapement wheel ébauche according to a direction coaxial to the axis of rotation of the escapement wheel ébauche, and blanking a part of the end of each tooth 14 of the escapement wheel ébauche so as to reduce the thickness of said part, in a single cutting operation; this operation allows to obtain the reduced end portions of each tooth 14;
- removing the cutting tool 20.

Via the particular positioning of the cutting tool 20 with respect to the escapement wheel ébauche, the reduced end portions obtained after the blanking operation, on the one hand, are identical for all of the teeth 14 of said escapement wheel, and on the other hand, are obtained in a single machining operation.

Advantageously, if the escapement wheel ébauche is obtained by a LIGA method, it is made from a plurality of other escapement wheel ébauches precisely distributed on a substrate. Said substrate includes optical guide-marks precisely arranged with respect to the escapement wheel ébauches and adapted to be read by optical sensors so as to indicate the precise position of each of said ébauches to the cutting tool 20. Thus, by being carried out optically, the operation of positioning the cutting tool 20 can be carried out rapidly and precisely for each of the escapement wheel ébauches to be machined.

Moreover, alternatively or in addition, during the operations of guiding the cutting or blanking tool 20, the method can include an operation of optical verification of the position of the cutting tool with respect to the escapement wheel ébauche machined or to be machined, in order to correct the position of the cutting tool 20 if necessary.

The invention claimed is:

1. A method for manufacturing an escapement wheel, comprising steps of:
   - creating an escapement wheel ébauche comprising a hub connected to a felloe by radial arms, and teeth regularly distributed around the periphery of the felloe; and
   - simultaneous machining of a reduction of cross-section of the free end of each tooth, by a cutting tool aligned coaxially with the escapement wheel ébauche.

2. The method according to claim 1, wherein the reduction of cross-section is formed by a reduced end portion including a bevel.

3. The method according to claim 2, wherein the reduction of cross-section is formed by a reduced end portion including a flat surface parallel to a plane in which the escapement wheel ébauche is inscribed.

4. The method according to claim 1, wherein the reduction of cross-section machined includes a reduced end portion having the shape of a surface of revolution orthogonal to a plane in which the escapement wheel ébauche is inscribed.

5. The method according to claim 1, wherein the step of creating the ébauche of an escapement wheel is carried out by a LIGA method.

6. The method according to claim 1, wherein the machining step is carried out by milling.

7. The method according to claim 1, wherein the machining step includes the successive operations of:
   - positioning the cutting tool so that its axis of rotation is the same as the axis of rotation of the escapement wheel ébauche;
   - guiding the cutting tool in translation towards the escapement wheel ébauche according to a direction coaxial to the axis of rotation of the escapement wheel ébauche, and blanking a part of the end of each tooth of the escapement wheel ébauche so as to generate a reduced end portion, in a single cutting operation; and
   - removing the tool.

* * * * *